United States Patent [19]

Shimomura et al.

[11] Patent Number: 4,511,293
[45] Date of Patent: Apr. 16, 1985

[54] INSERT CUTTER

[75] Inventors: Hiroshi Shimomura, Tokyo; Tatsuo Arai, Kitamoto, both of Japan

[73] Assignee: Mitsubishi Kinzoku Kabushiki Kaisha, Tokyo, Japan

[21] Appl. No.: 454,100

[22] Filed: Dec. 28, 1982

[30] Foreign Application Priority Data

Dec. 29, 1981 [JP] Japan .................. 56-213170
Dec. 29, 1981 [JP] Japan .................. 56-213171
Mar. 15, 1982 [JP] Japan .................. 57-40499

[51] Int. Cl.$^3$ .......................... B26D 1/12
[52] U.S. Cl. ................................. 407/41
[58] Field of Search ............. 407/36, 37, 38, 39, 407/40, 41, 42, 49, 59, 61; 408/203.5

[56] References Cited

U.S. PATENT DOCUMENTS

| 2,102,478 | 12/1937 | Miller | 407/38 |
|---|---|---|---|
| 2,367,221 | 1/1945 | Kraus | 407/39 |
| 3,104,453 | 9/1963 | Greenleaf | 407/49 |
| 3,116,538 | 1/1964 | Severson | 407/41 |
| 3,163,919 | 1/1965 | Turner | 407/38 |
| 3,273,222 | 9/1966 | Begle | 407/38 |
| 3,339,257 | 9/1967 | Hargreaves et al. | 407/49 |
| 3,378,901 | 4/1968 | Dupuis | 407/38 |
| 3,868,752 | 3/1975 | Hopkins | 407/42 |
| 3,955,259 | 5/1976 | Gustafsson | 407/113 |

FOREIGN PATENT DOCUMENTS

| 024597 | 3/1981 | European Pat. Off. | 407/40 |
|---|---|---|---|
| 137413 | 5/1979 | German Democratic Rep. | 407/36 |

Primary Examiner—Francis S. Husar
Assistant Examiner—William E. Terrell
Attorney, Agent, or Firm—Cushman, Darby & Cushman

[57] ABSTRACT

A cutter for processing a surface of a metal workpiece includes a body of a generally circular cross-section. The body has a plurality of generally radially outwardly-opening recesses formed in a circumferential surface of the body in circumferentially spaced relation to each other. Each of the recesses includes a first bearing surface sloping radially outwardly in a direction away from a forward end face of the body and extending to the circumferential surface. The recess also includes a second bearing surface sloping radially outwardly toward the forward end face. The second bearing surface is disposed forwardly of the first bearing surface and disposed at a predetermined angle relative to the first bearing surface. A plurality of cutter inserts of a quadrilateral shape are received in the plurality of recesses, respectively. Two adjacent side faces of the insert are held in contact with the first and second bearing surfaces, respectively. The insert has an end cutting edge at the corner thereof at which the side face held against the second bearing surface and the side face facing away from the first bearing surface intersect each other. The insert also has a peripheral cutting edge formed on the side face facing away from the first bearing surface. A plurality of clamp members are received in the recesses, respectively, and releasably hold the inserts in position.

6 Claims, 25 Drawing Figures

INSERT CUTTER

BACKGROUND OF THE INVENTION

1. Field of the Invention

This invention relates to a cutter having a plurality of indexable cutter inserts releasably attached to a peripheral surface of a cutter body adjacent to a forward end thereof.

2. Prior Art

The type of cutters with which the present invention is concerned include a face milling cutter, a boring cutter, a side milling cutter and the like. For simplicity of illustration, however, the invention will be hereinafter described with reference to the face milling cutter. Inserts for use in such a cutter has a quadrilateral shape such as a square, a rectangle, a parallelogram, a rhombus and the like.

Figure 1:
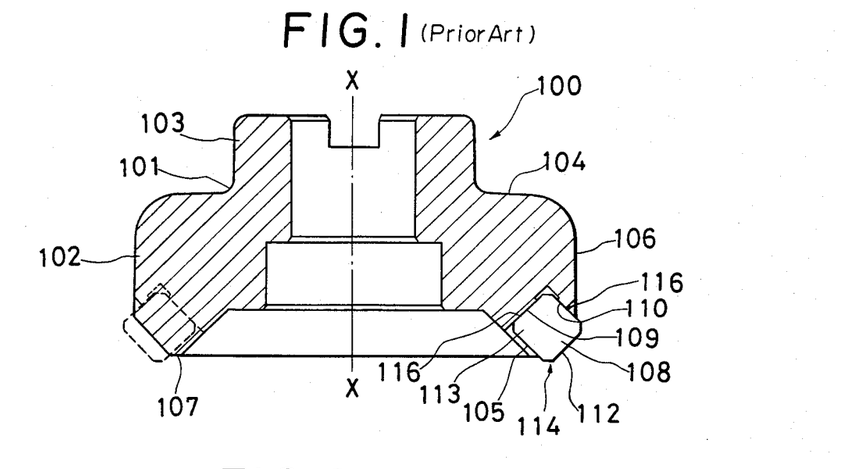
FIG. 1 is a cross-sectional view of a conventional cutter employing square inserts.
Figure 2:
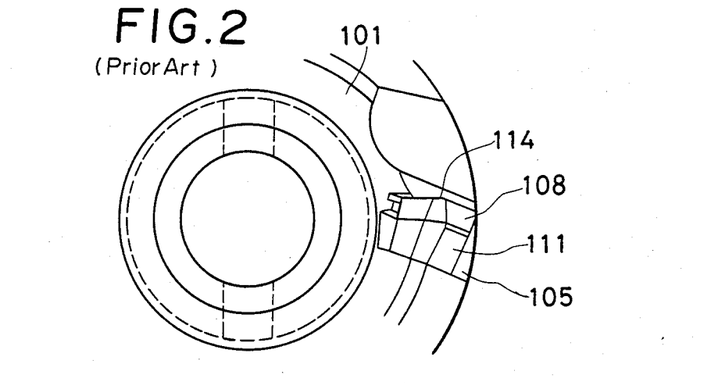
FIG. 2 is a fragmentary end view of the conventional cutter.

Generally, conventional cutters under consideration have been designed to use a plurality of inserts of identical size and shape attached to a cutter body. FIGS. 1 and 2 show one such conventional face milling cutter 100 which comprises a body 101 including a disc-shaped base portion 102 and a boss 103 extending coaxially from the base portion 102 at its rearward end face 104, the boss 103 being adapted to be fixedly secured to a spindle of a milling machine. The base portion 102 of the cutter body 101 has a plurality of recesses 105 formed in its circumferential surface 106 in circumferentially spaced relation to each other and disposed adjacent to its forward end face 107. A plurality of indexable square inserts 108 are received in the respective recesses 105 and clamped thereto by clamp members 111. As shown in FIG. 1, each of the recesses 105 includes a first bearing surface 109 sloping radially inwardly toward the forward end face 107, and a second bearing surface 110 sloping radially outwardly toward the forward end face 107, the first and second bearing surfaces 109 and 110 being disposed right-angularly.

The square insert 108 has four main cutting edges 112 defined by four side faces 116 and a front face 113, and four auxiliary cutting edges 114 at its four corners. For attaching or setting the square insert 108 to the cutter body 101, the insert 108 is received in the recess 105 in such a manner that the two adjacent side faces 116 of the insert remote from the indexed auxiliary cutting edge 114 are held in contact with the first and second bearing surfaces 109 and 110, respectively. Then, the insert is held in position by the clamp member 111 received in the recess 105. The indexed auxiliary cutting edge 114 disposed slightly beyond the forward end face 107 serves as an end cutting edge while the indexed main cutting edge 112 facing away from the first bearing surface 109 serves as a peripheral cutting edge. It is important that the indexed auxiliary cutting edges 114 of all the inserts 108 attached to the cutter body 101 should be located substantially in a common plane perpendicular to an axis X of rotation of the cutter body 101 to form a satisfactory finish surface on a metal workpiece processed by the face milling cutter. Since the two adjacent side faces 116 of the insert 108 supported by the first and second bearing surfaces 109 and 110 are disposed remote from the indexed auxiliary cutting edge 114, the position of the indexed auxiliary cutting edge is liable to be inaccurate due to the manufacturing tolerance of the insert. Thus, the deviation of the auxiliary cutting edge of each insert from its preselected indexing position can not be kept to a minimum.

Figure 3:
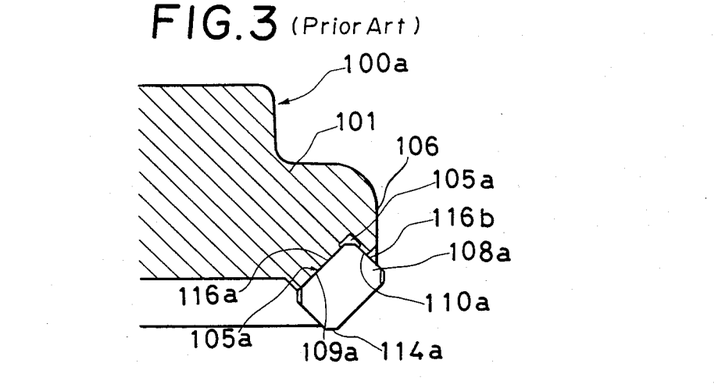
FIG. 3 is a view similar to FIG. 1 but showing rectangular inserts employed in the cutter.

A conventional face milling cutter 100a shown in FIG. 3 differs from the face milling cutter 100 of FIG. 1 only in that a plurality of recesses 105a formed in a circumferential surface 106 of a cutter body 101 are designed to receive rectangular inserts 108a of identical size. With this conventional face milling cutter 100a, an indexed auxiliary cutting edge 114a is also liable to be displaced out of its proper indexing position when the insert 108a is clamped to the cutter body 101 since it is disposed remote from a pair of bearing surfaces 109a and 110a of the recess 105a against which adjacent longer and shorter side faces 116a and 116b are held respectively.

Figure 4:
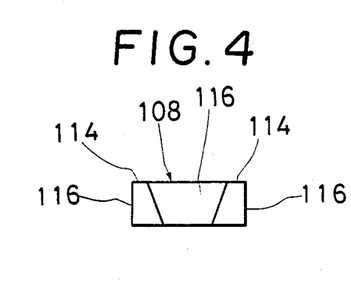
FIG. 4 is a front elevational view of the square insert.
Figure 5:
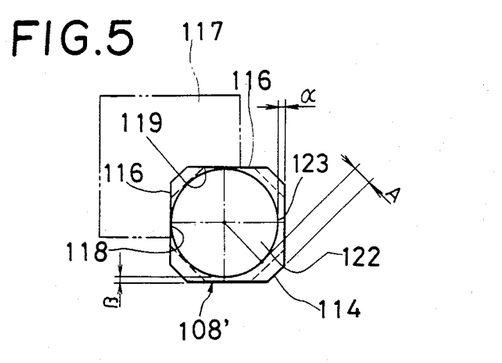
FIG. 5 is an elevational view of a jig for determining the position of an auxiliary cutting edge of the square insert.

The square insert 108 (FIG. 4) for use in the conventional milling cutter 100 of FIG. 1 is manufactured using a jig or fixture 117 having a pair of right-angularly disposed supporting surfaces 118 and 119, as shown in FIG. 5. Two adjacent side faces 116 of a square insert blank 108' are held in contact with the pair of supporting surfaces 118 and 119, respectively. In this condition, the corner of the square insert blank 108', disposed in diagonal relation to the corner, at which the two adjacent side faces 116 held against the supporting surfaces 118 and 119 intersect each other, is located or indexed in a machining position. This indexed corner of the insert blank 108' is machined to provide the auxiliary cutting edge 114. A pin 122 of a circular cross-section is used to determine the position of the auxiliary cutting edge 114 to be formed. As shown in FIG. 5, the circumferential surface of the pin 122 serves as a nominal inscribed circle 123 to which the two supporting surfaces 118 and 119 of the jig 117 and hence the two adjacent side faces 116 of the insert blank 108' held against them are tangential. Regardless of dimentional variations $\alpha$ and $\beta$ of the insert blank with respect to the nominal inscribed circle 123, the position of the auxiliary cutting edge 114 is determined in such a manner that it is spaced a predetermined distance A from the nominal inscribed circle 123. As a result, the length of the machined auxiliary cutting edge 114 is affected by both of the dimensional variations $\alpha$ and $\beta$. Therefore, the resultant auxiliary cutting edge 114 is susceptible to a relatively large variation in length.

Figures 6, 7, 8:
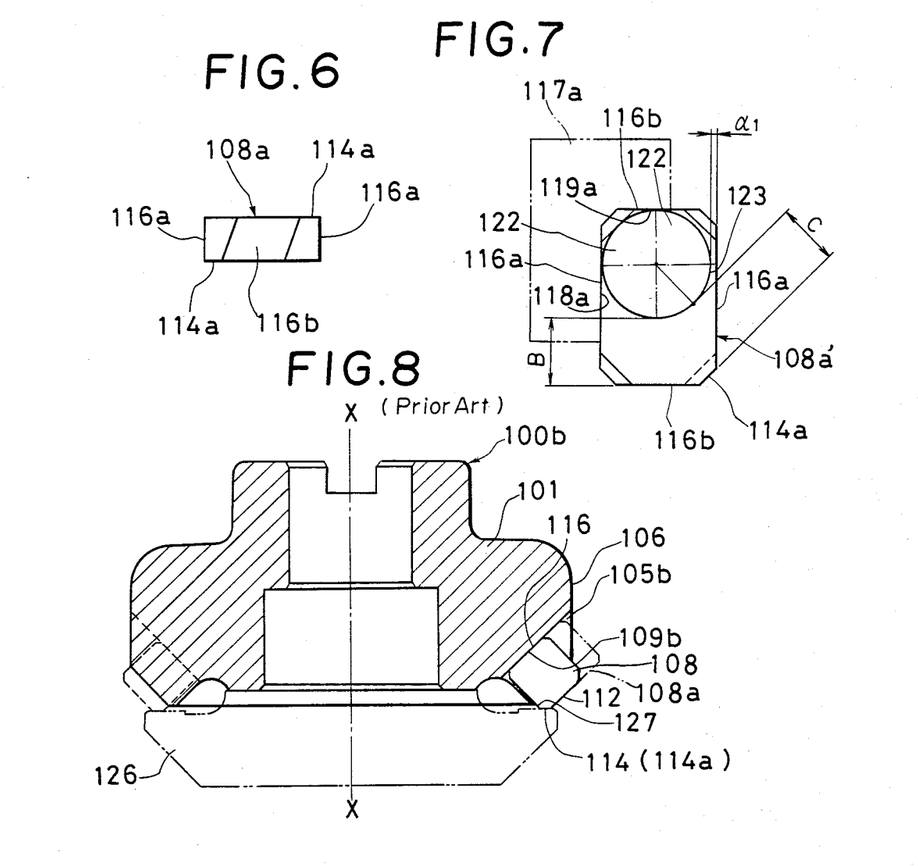
FIG. 6 is a front elevational view of the rectangular insert.
FIG. 7 is an elevational view of a jig for determining the position of an auxiliary cutting edge of the rectangular insert.
FIG. 8 is a cross-sectional view of another conventional cutter.

The rectangular insert 108a (FIG. 6) for use in the conventional milling cutter 100a of FIG. 3 are manufactured in a manner similar to that described above for the square insert 108 in FIG. 5. More specifically, as shown in FIG. 7, two adjacent longer and shorter side faces 116a and 116b of a rectangular insert blank 108a' are held in contact with a pair of supporting surfaces 118a and 119a of a jig 117a, respectively. The corner of the insert blank 108a' remote from the supporting surfaces 118a and 119a of the jig 117a is machined to provide the auxiliary cutting edge 114a as described above for the square insert 108. The pin 122 is also used to determine the position of the auxiliary cutting edge 114a to be machined, the circumferential surface of the pin 122 serving as a nominal inscribed circle 123. The position of the auxiliary cutting edge 114a is determined in such a manner that it is spaced a predetermined distance C from the nominal inscribed circle 123. The distance C is determined by a distance B between the inscribed circle 123 and the shorter side face 116b of the insert blank 108a' remote from the supporting surface 119a of the jig 117a. Thus, the positioning of the auxiliary cutting edge 114a is affected by both a dimensional variation $\alpha_1$ of the insert blank 108a' relative to the nominal inscribed circle 123 and a dimensional variation of the longer side face 116a of the insert blank 108a'. As a result, the resultant auxiliary cutting edge 114a of the rectangular insert 108a is also susceptible to a relatively large variation.

Another conventional face milling cutter 100b shown in FIG. 8 differs from the conventional face milling cutters 100 and 100a of FIGS. 1 and 3 in that each recess 105b is not provided with a bearing surface corresponding to the second bearing surfaces 110 and 110a of the cutters 100 and 100a, so that a bearing surface 109b corresponding to the first bearing surfaces 109 and 109a extends to the circumferential surface 106 of the cutter body 101. This conventional face milling cutter 100b can employ inserts 108a of a rectangular shape as well as inserts 108 of a square shape. For attaching the square insert 108 to the cutter body 101, the forward end of the cutter body is brought into engagement with an upper face of an insert-setting member 126 having a positioning surface 127 disposed in a plane perpendicular to the axis X of rotation of the cutter body 101. The positioning or setting of the square insert 108 is effected in such a manner that one side face 116 of the insert 108 facing away from the indexed main cutting edge 112 is held against the bearing surface 109b of the recess 105b and that the auxiliary cutting edge 114 is held against the positioning surface 127 of the insert-setting member 126. Then, the square insert 108 is fixed to the cutter body 101 by a clamp member (not shown). Inserts 108a of a rectangular shape can be attached to the cutter body 101 in the same manner. With this positioning method, the auxiliary cutting edge 114, 114a can be positioned in its proper indexed position regardless of dimensional variations of the insert. This conventional face milling cutter 100b has been found disadvantageous, however, in that the indexed auxiliary cutting edge 114, 114a is susceptible to damage since it is directly brought into engagement with the insert-setting member 126 during the attachment of the insert to the cutter body 101. Another disadvantage is that it is quite difficult to set the insert on the cutter body 101 attached to the spindle of the face-milling machine since the setting of the insert requires the insert-setting member 126. A further disadvantage is that the insert can not be so easily attached to the cutter body 101 since the insert-setting member 126 is required.

SUMMARY OF THE INVENTION

It is therefore an object of this invention to provide a cutter of the type in which a plurality of cutter inserts each having a peripheral cutting edge and an end cutting edge can be easily attached to a cutter body with the end cutting edges disposed in their proper indexed positions which lie substantially in a common plane perpendicular to the axis of rotation of the cutter body.

Another object is to provide such a cutter in which plural kinds of inserts having peripheral cutting edges of different length can be interchangeably attached to the cutter body.

According to the present invention, there is provided a cutter for processing a surface of a metal workpiece which comprises a body of a generally circular cross-section having an axis of rotation therethrough, the body having a forward end face, a rearward end face and a circumferential surface lying between the forward and rearward end faces, the body having a plurality of generally radially outwardly-opening recesses formed in the circumferential surface in circumferentially spaced relation to each other and disposed adjacent to the forward end face, each of the recesses including a first bearing surface sloping radially outwardly in a direction away from the forward end face and extending to the circumferential surface, the recess also including a second bearing surface sloping radially outwardly toward the forward end face, and the second bearing surface being disposed forwardly of the first bearing surface and disposed at a predetermined angle relative to the first bearing surface; a plurality of cutter inserts received in the plurality of recesses, respectively, each insert being of a quadrilateral shape having four side faces, front and rear faces and four corners, two adjacent side faces being held in contact with the first and second bearing surfaces, respectively, the insert having an end cutting edge at the corner thereof at which the side face held against the second bearing surface and the side face facing away from the first bearing surface intersect each other, the end cutting edge extending slightly beyond the forward end face, and the insert having a peripheral cutting edge formed on the side face facing away from the first bearing surface; and a plurality of clamp means received in the plurality of recesses, respectively, and releaseably holding the inserts in position.

DESCRIPTION OF THE PREFERRED EMBODIMENTS OF THE INVENTION

FIGS. 9 to 12 show a face milling cutter 10 which comprises a body 11 including a base portion 12 of a circular cross-section having a forward end face 13, a rearward end face 14 and a circumferential surface 15 lying between the forward and rearward end faces 13 and 14. The cutter body 11 also includes a boss 16 of a circular cross-section extending coaxially from the base portion 12 at the rearward end face 14. The cutter body 11 has a central bore 17 formed axially therethrough. The forward end face 13 is disposed in a plane perpendicular to an axis X of rotation of the cutter body 11. The boss 16 is adapted to be secured to a spindle (not shown) of a milling machine. A corner of the base portion 12 remote from the boss 16 is chamfered to provide a tapered surface 18.

The base portion 12 of the cutter body 11 has a plurality of generally radially outwardly-opening recesses 20 formed in the circumferential surface 15 in circumferentially-spaced relation to each other and disposed adjacent to the forward end face 13, these recesses 20 receiving cutter inserts 35 of a rectangular shape and clamp members 45, as will hereinafter more fully be described.

Each of the recesses 20 has a generally channel-shaped cross-section defined by a pair of circumferentially-facing opposed first and second side walls 21 and 22 and a bottom wall 23 interconnecting the first and second side walls 21 and 22 at their inner ends, the recess having a width extending rearwardly and radially from the forward end face to the circumferential surface. The first and second side walls are disposed in respective planes generally along the axis X of rotation of the cutter body 11. The bottom wall 23 of the recess 20 slopes radially outwardly from its inner end in a direction away from the forward end face 13. That portion of the bottom wall 23 adjacent to the first side wall 21 serves as a first flat bearing surface 23a. Preferably, a ridge is formed on and extends along the bottom wall 23 in parallel closely spaced relation to the first side wall 21, the ridge having a flat top surface which serves as the first bearing surface 23a.

The recess 20 also has a forward end wall 25 which faces in a direction away from the forward end face 13 of the base portion 12 and slopes radially outwardly from its inner end toward the forward end face 13, the forward end wall 25 intersecting the bottom wall 23 at its inner end. The forward end wall 25 is defined by a forward end projection 28. The forward end wall 25 is stepped or raised adjacent to the first side wall 21 to define a second flat bearing surface 26. The first and second bearing surfaces 23a and 26 are right-angularly disposed.

A threaded hole (not shown) is formed in the bottom wall 23 and extends substantially perpendicular to the bottom wall 23.

A depression 30 is formed in the circumferential surface 15 adjacent to the first side wall 21 of each recess 20, the depression 30 having a generally concavely arcuate cross-section and extending along the recess 20.

The depression 30 is further cut away adjacent to the first side wall 21 to form a first cut-away portion 31 extending therealong, the first cut-away portion 31 having a concavely arcuate cross-section. By virtue of the provision of this first cut-away portion 31, the second side wall 22 is greater than the first side wall 21 in width or dimension in a direction perpendicular to the bottom wall 23. The depression 30 is further depressed or cut away adjacent to the recess 20 and the forward end face 13 to form a second cut-away portion 32, the second cut-away portion 32 opening to the forward end face 13. The second cut-away portion 32 also opens to the recess 20 adjacent to the forward end wall 25. During a cutting operation, cuttings of a metal workpiece produced by an auxiliary or end cutting edge 40a of the rectangular insert 35 are smoothly discharged from the second cut-away portion 32 provided near the auxiliary cutting edge 40a.

Figure 13:
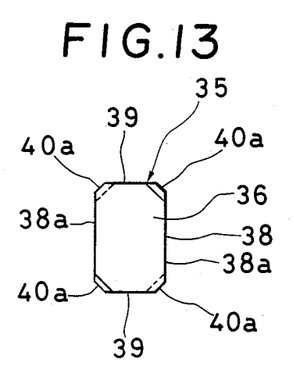
FIG. 13 is a plan view of the rectangular insert.
Figure 14:
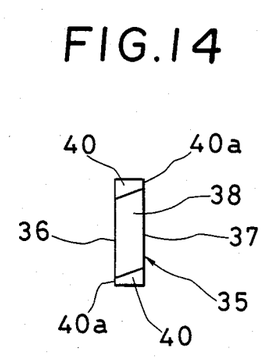
FIG. 14 is a side elevational view of the rectangular insert.
Figure 15:
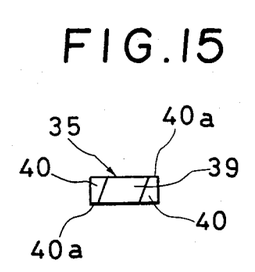
FIG. 15 is a front elevational view of the rectangular insert.
Figure 16:
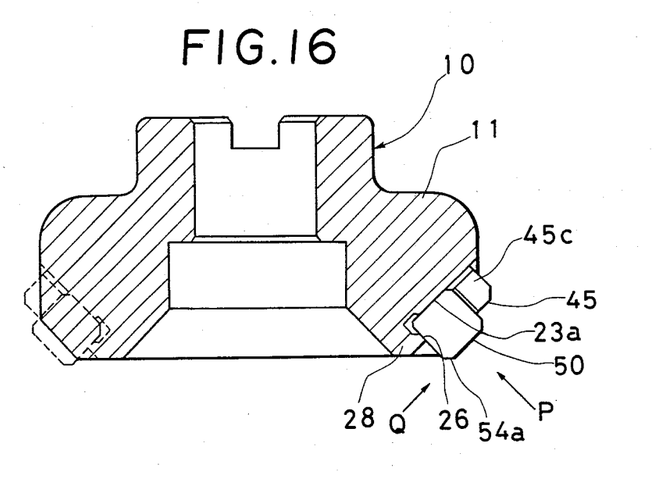
FIGS. 16 to 19 are views similar to FIGS. 9 to 12, respectively, but showing square inserts employed in the cutter.
Figure 17:
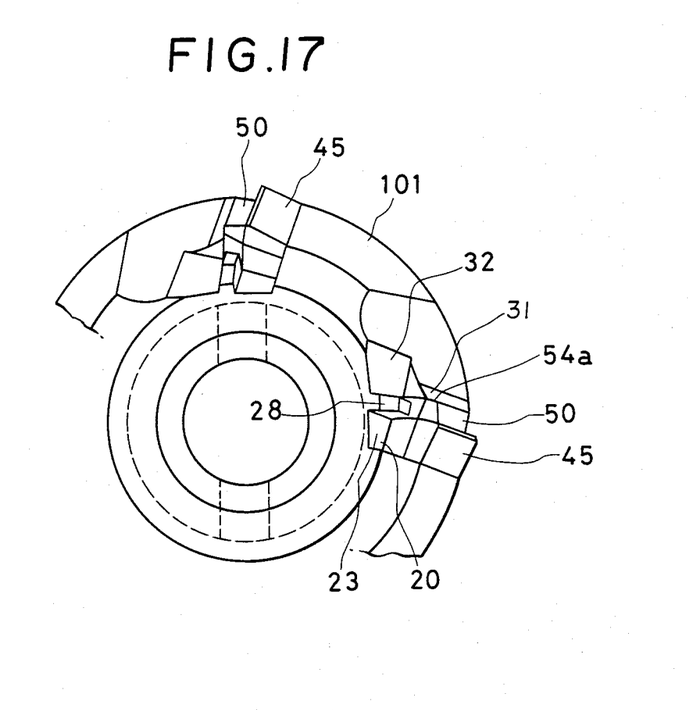
Figure 18:
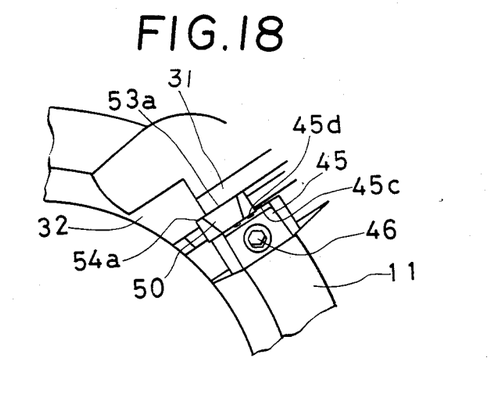
Figure 19:
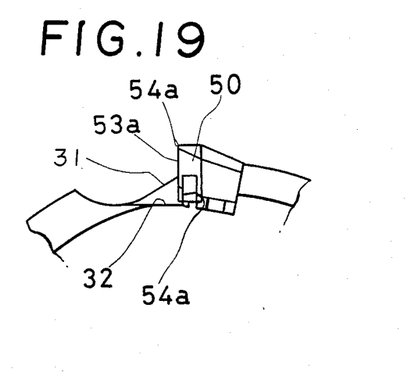

The insert 35 of a rectangular shape as best shown in FIGS. 13 to 14 is of the indexable type and is made of metal such as high speed steel. The rectangular insert 35 is defined by a pair of parallel front and rear faces 36 and 37, a pair of parallel longer side faces 38 and a pair of parallel shorter side faces 39. Four corners of the rectangular insert 35 are chamfered to form four corner faces 40. Two diagonal corner faces 40 are sloping from the front face 36 to the rear face 37 and directed toward each other. Two corner edges 40a defined by respective corner faces 40 and the front face 36 serve as auxiliary cutting edges which constitute end cutting edges when the insert 35 is attached to the cutter body 11. Two edges 38a defined by the two longer side faces 38 and the front face 36 serve as two main cutting edges, respectively, which constitute peripheral cutting edges when the insert 35 is attached to the cutter body 11. Similarly, the other two diagonal corner faces 40 slope from the rear face 37 to the front face 36 and directed toward each other. Two corner edges 40a defined by respective corner faces 40 and the rear face 37 serve as auxiliary cutting edge 40a. Two edges defined by the two longer side faces 38 and the rear face 37 serve as two main cutting edges 38a, respectively.

Figure 9:
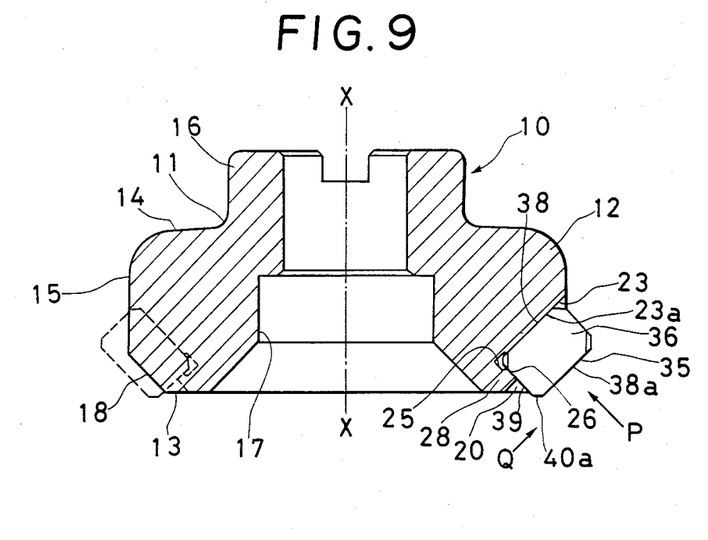
FIG. 9 is a cross-sectional view of a cutter provided in accordance with the present invention, showing rectangular inserts employed in the cutter.
Figure 10:
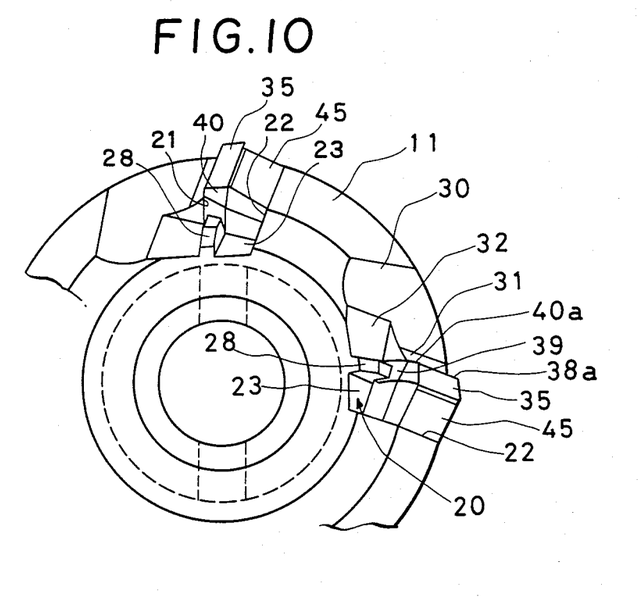
FIG. 10 is a fragmentary end view of the cutter of FIG. 9.
Figures 11, 12:
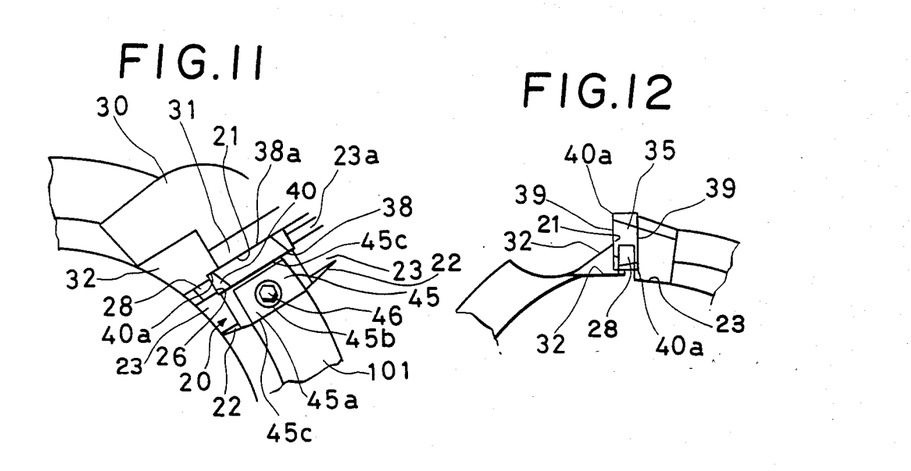
FIG. 11 is a view seen in the direction indicated by arrow P of FIG. 9.
FIG. 12 is a view seen in the direction indicated by arrow Q of FIG. 9.

The face milling cutter 10 shown in FIGS. 9 to 12 employs a plurality of rectangular inserts 35. For attaching each rectangular insert 35 to the cutter body 11, the insert is first received in the recess 20 with one longer side face 38 held against the first bearing surface 23a on the bottom wall 23 and with one shorter side face 39 held against the second bearing surface 26 on the forward end wall 25. In this condition, the front face 36 of the insert 35 is held in abutment with the first side wall 21, this front face 36 serving as a rake surface. Then, the clamp member 45 of a generally rectangular shape is received in the recess 20 with its opposite side or clamping surfaces 45c disposed respectively in contact with the rear face 37 of the insert 35 and the second side wall 22 of the recess 20. The clamp member 45 has a generally wedge-shaped cross-section with the opposite clamping faces converging in a direction away from its top face 45a. The clamp member 45 has a screw hole 45b formed therethrough and extending from its top face 45a to its bottom face facing the bottom wall 23 of the recess 20. Then, a clamping screw 46 is threaded through the screw hole 45b of the clamp member 45 into the threaded hole in the bottom wall 23 of the recess 20 to firmly hold the rectangular insert 35 against movement. In this condition, the main or peripheral cutting edge 38a remote from the bottom wall 23 and its mating auxiliary or end cutting edge 40a are disposed in their respective indexed positions, as shown in FIG. 9, and the indexed auxiliary cutting edge 40a is disposed slightly beyond the forward end face 13 of the cutter body 11.

Figure 20:
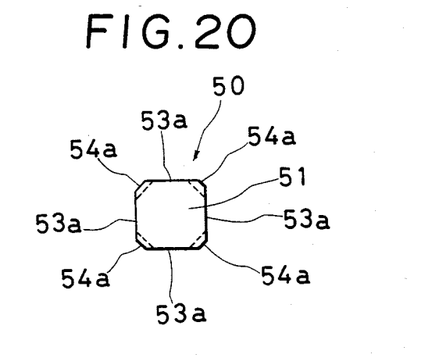
FIGS. 20 to 22 are views similar to FIGS. 13 to 15, respectively, but showing the square insert.
Figure 21:
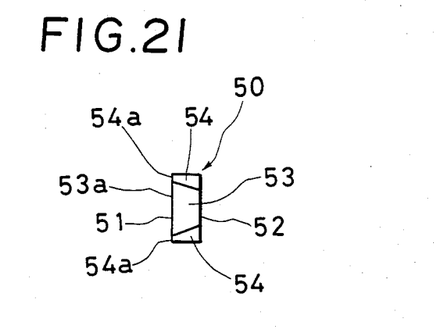
Figure 22:
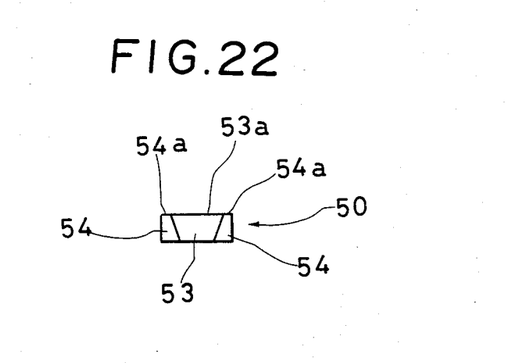

As shown in FIGS. 16 to 19, a plurality of indexable square inserts 50 can also be attached to the cutter body 11. The square insert 50 is made of a metal plate and is defined by a pair of parallel front and rear faces 51 and 52 and four side faces 53, as best shown in FIGS. 20 to 22. Four corners of the square insert 50 are chamfered to form four corner faces 54. The four corner faces 54 are sloping from the front face 51 to the rear face 52 and directed toward the center of the square insert 50. Four corner edges 54a defined respectively by the four corner faces 54 and the front face 51 serve as auxiliary or end cutting edges. Four edges 53a defined by the four side faces 53 and the front face 51 serve as main or peripherial cutting edges.

As shown in FIGS. 16 to 19, the square insert 50 is attached in the manner described above for the rectangular insert 35. Preferably, grooves 45d are formed in the clamping surface 45c of the clamp member 45 held in abutment with the rear face 52 of the square insert 50 to prevent a melt-adhesion of produced cuttings stuck to the square insert 50.

Figure 23:
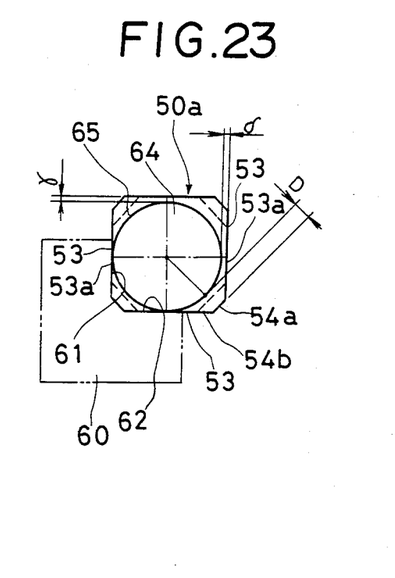
FIG. 23 is an elevational view of a jig for determining the position of an auxiliary cutting edge of the square insert of FIG. 16.

As shown in FIG. 23, preferably, the square insert 50 for use in the face milling cutter 10 is manufactured using a jig 60 having a pair of first and second supporting surfaces 61 and 62 disposed perpendicularly to each other. Two adjacent side faces 53 of a square insert blank 50a are held in contact with the first and second supporting surfaces 61 and 62, respectively. The corner 54b of the square insert blank 50a, at which the side face 53 held against the second supporting surface 62 and the side face 53 facing away from the first supporting surface 61 intersect each other, is located or indexed in a machining position. This indexed corner 54b is machined to provide the auxiliary cutting edge 54a. A pin 64 of a circular cross-section is used to determine the position of the auxiliary cutting edge 54a to be formed. As shown in FIG. 23, the circumferential surface of the pin 64 serves as a nominal inscribed circle 65 to which the two supporting surfaces 61 and 62 of the jig 60 and hence the two adjacent side faces 53 of the insert blank 50a held against them are tangential. The position of the auxiliary cutting edge 54a is determined in such a manner that it is spaced a predetermined distance D from the nominal inscribed circle 65. Thus, as seen from FIG. 23, only a dimensional variation δ of the square insert blank 50a relative to the nominal inscribed circle 65 contributes to a variation in length of the resultant auxiliary cutting edge 54a, and a dimensional variation γ has nothing to do with the length of the resultant auxiliary cutting edge 54a. Therefore, the auxiliary cutting edge 54a is subjected to a relatively small variation in length. With this method, a manufacturing tolerance of the square insert blank 50a can be less close without unduly affecting the length of the auxiliary cutting edge 54a. More specifically, the tolerance of the side faces 53 of the insert blank 50a determined by the nominal inscribed circle 65 can be ±0.13 mm which tolerance has conventionally been ±0.05 mm. Therefore, the square insert 50 can be manufactured at lower costs.

Figure 24:
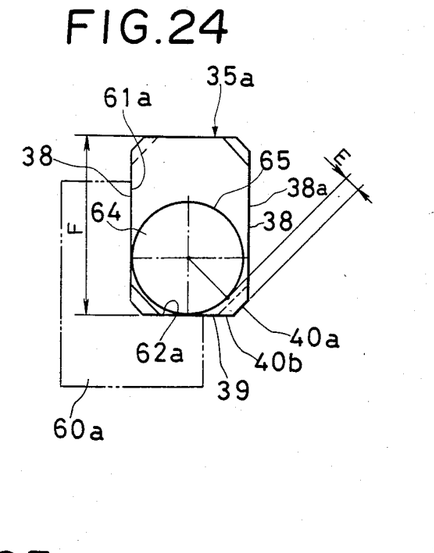
FIG. 24 is an elevational view of a jig for determining the position of an auxiliary cutting edge of the rectangular insert of FIG. 9.

As shown in FIG. 24, preferably, the rectangular insert 35 for use in the face milling cutter 10 is manufactured in a manner similar to that described above for the square insert 50 with reference to FIG. 23. More specifically, adjacent longer and shorter side faces 38 and 39 of a rectangular insert blank 35a are held against first and second supporting surfaces 61a and 62a of a jig 60a, respectively. In this condition, the corner 40b of the rectangular insert blank 35a, at which the shorter side face 39 held against the second supporting surface 62a and the longer side face 38 facing away from the first supporting surface 61a intersect each other, is located or indexed in a machining position. The indexed corner 40b of the rectangular insert blank 35a is machined to provide the auxiliary or end cutting edge 40a. The position of the auxiliary cutting edge 40a to be formed is determined in such a manner that it is spaced a predetermined distance E from the nominal inscribed circle 65 of the pin 64. Thus, only a dimensional variation in the length of the shorter side face 39 of the insert blank 35a contributes to a variation in the length of the resultant auxiliary cutting edge 40a, and a dimensional variation in the length F of the longer side face 38 has nothing to do with the length of the auxiliary cutting edge 40a. Therefore, the auxiliary cutting edge 40a is subjected to a relatively small variation in length. With this method, a manufacturing tolerance of the rectangular insert blank 35a can be less close without unduly affecting the length of the resultant auxiliary cutting edge 40a. More specifically, the tolerance of the longer side faces 38 of the rectangular insert blank 35a can be ±0.2 mm or more which tolerance has conventionally been ±0.05 mm. Therefore, the rectangular inserts 35 can be manufactured at lower costs.

Since the square insert 50 and the rectangular insert 35 are designed to be attached to the cutter body 11 of the face milling cutter 10, each side face 53 of the square insert 50 and each shorter side face 39 of the rectangular insert 35 are substantially equal in length to each other.

Figure 25:
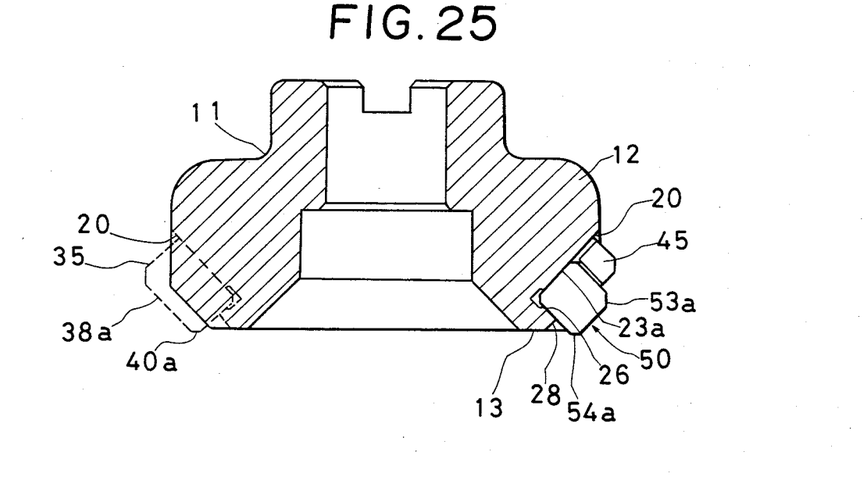
FIG. 25 is a view similar to FIG. 9 but showing the square inserts and at least one rectangular insert employed in the cutter.

The face milling cutter 10 shown in FIG. 25 employs a plurality of square inserts 50 and at least one rectanglar insert 35. With this arrangement, the milling cutter 10 can efficiently machine or process a metal workpiece having one or more projections on its surface, such as a cast article and a forged article. More specifically, if the metal workpiece has a projection of a relatively small size, the projection is cut or removed by both an upper portion of the main or peripheral cutting edge 53a of each square insert 50 and a central portion of the main cutting edge 38a of the rectangular insert 35, the upper portion of the main cutting edge of the square insert 50 being disposed remote from the forward end face 13 of the cutter body 11. If the metal workpiece has a projection of a large size, such a projection is cut or removed mainly by an upper portion of the main cutting edge 38a of the rectangular insert 35 which upper portion is remote from the forward end face 13. Thus, the main cutting edge 38a of the rectangular insert 35 is longer than that of the square insert 50 and therefore is greater in depth of cut or amount of removal of metal from the metal workpiece, thereby ensuring that the machining or processing of the workpiece having a projection or projections of a large size on its surface can be efficiently effected.

As described above, the face milling cutter 10 can employ not only a plurality of inserts of identical size but also a plurality of inserts of different size having peripheral cutting edges of different length, depending on the required depth of cut.

Since the second bearing surface 26 for supporting the side face of the insert is disposed near the indexed auxiliary or end cutting edge, the indexed auxiliary cutting edges of all the inserts attached to the cutter body are located in their proper indexing position regardless of the manufacturing tolerance of the insert, the proper indexing positions lying substantially in a common plane perpendicular to the axis X of the cutter body.

Further, the inserts can be easily attached to the face milling cutter 10 attached to the spindle of the milling machine.

The inserts attached to the cutter body 11 may have any radial rake angle such as a positive, a zero or a negative radial rake angle and also may have any axial rake angle such as a positive, a zero or a negative axial rake angle.

While the face milling cutter according to the present invention has been specifically shown and described herein, the invention itself is not to be restricted by the exact showing of the drawings or the description thereof. For example, although the forward end projection 28, defining the forward end face 25 on which the second bearing surface 26 is formed, is formed integrally with the cutter body 11, it may be formed as a separate element such as a pin secured to the cutter body. The second bearing surface 26 is subjected to quite a small load during the operation of the face milling cutter 10. The main purpose of the second bearing surface 26 is to position the insert. With the use of such a seperate element constituting the forward end projection 28, the cutter body 11 can be machined to the required shape quite easily.

The auxiliary cutting edge 40a, 54a is shown as a straight edge, but it may be convexly arcuate.

What is claimed is:

1. A cutter for processing a surface of a metal workpiece which comprises:
    (a) a body of a generally circular cross-section having an axis of rotation therethrough, said body being of a one-piece solid construction and having a forward end face, a rearward end face and a circumferential surface lying between said forward and rearward end faces, said body having a plurality of generally radially outwardly-opening recesses each formed with a predetermined width extending rearwardly and radially with respect to said circumferential surface, said recesses being in circumferentially spaced relation to each other and disposed adjacent said forward end face so that at least a portion of each of said recesses extends from the forward end face to the circumferential surface of said body, each of said recesses including a first bearing surface sloping radially outwardly in a direction away from said forward end face and extending to said circumferential surface, said recess also including means defining a second bearing surface sloping radially outwardly toward said forward end face, said second bearing surface being disposed forwardly of and extending toward said first bearing surface, said second bearing surface being disposed at a predetermined angle relative to said first bearing surface, so that said first bearing surface has a width extending rearwardly and radially less than the predetermined width of said recess;
    (b) a plurality of cutter inserts received in said plurality of recesses, respectively, each insert being of a quadrilateral shape having four side faces, front and rear faces and four corners, two adjacent side faces being held in contact with said first and second bearing surfaces, respectively, said insert having an end cutting edge at the corner thereof at which the side face held against the said second bearing surface and the side face facing away from the said first bearing surface intersect each other, said end cutting edge extending slightly beyond said forward end face, and said insert having a peripheral cutting edge formed on the side face facing away from the said first bearing surface; and
    (c) a plurality of elongated clamp members received in said plurality of recesses, respectively, and releasably holding said inserts in position, each clamp member extending along said first bearing surface generally coextensive therewith.

2. A cutter according to claim 1, in which said recess has a generally channel-shaped cross section defined by a pair of circumferentially-facing opposed first and second side walls joined by a bottom wall at their inner ends, said bottom wall extending at least partially radially beyond said first side wall, said first bearing surface being formed on said bottom wall, said front face of said insert being held in engagement with said first side wall, said recess also including a forward end wall formed adjacent said forward end face and sloping radially outwardly toward said forward end face, and said second bearing surface being formed on said forward end wall.

3. A cutter according to claim 1, in which each of said plurality of inserts has a square shape.

4. A cutter according to claim 1, in which each of said plurality of inserts has a rectangular shape having two longer side faces and two shorter side faces, adjacent longer and shorter side faces being held against said first and second bearing surfaces, respectively.

5. A cutter according to claim 1, in which at least one of said inserts has a longer peripheral cutting edge than the other inserts have.

6. A cutter according to claim 1, in which said clamp member comprises a generally wedge-shaped cross-section having converging opposite side walls disposed respectively in contact with said rear face of said insert and said second side wall of said recess, said clamp member also comprising a clamping screw threadedly extending therethrough into said body to releasably hold said insert against movement.

* * * * *